United States Patent [19]
Rudolph

[11] Patent Number: 6,068,247
[45] Date of Patent: May 30, 2000

[54] HYDRAULIC SLEEVE

[75] Inventor: Axel Rudolph, Bensheim, Germany

[73] Assignee: Firma Carl Freudenberg, Weinheim, Germany

[21] Appl. No.: 08/853,141

[22] Filed: May 8, 1997

[30] Foreign Application Priority Data

May 9, 1996 [DE] Germany ............... 196 18 688

[51] Int. Cl.[7] .................................................. F16F 5/00
[52] U.S. Cl. ................... 267/140.12; 267/141.2; 267/219
[58] Field of Search ............. 267/140.11, 140.12, 267/140.13, 140.3, 219, 220, 141.2; 248/562, 636, 638; 180/300, 312, 902

[56] References Cited

U.S. PATENT DOCUMENTS

| | | | |
|---|---|---|---|
| 4,605,207 | 8/1986 | Konishi | 267/140.12 X |
| 4,717,111 | 1/1988 | Saito | 267/140.12 X |
| 4,768,760 | 9/1988 | Le Fol | 267/140.12 |
| 4,834,351 | 5/1989 | Freudenberg et al. | 267/141.2 |
| 4,883,260 | 11/1989 | Kanda | 267/140.12 |
| 5,316,274 | 5/1994 | Rudolph | 267/140.12 |
| 5,702,094 | 12/1997 | McLelland et al. | 267/140.12 |

FOREIGN PATENT DOCUMENTS

| | | | |
|---|---|---|---|
| 442764 | 8/1991 | France | 267/140.12 |
| 2701299 | 8/1994 | France | 267/140.12 |
| 7-293627 | 4/1994 | Japan | 267/140.12 |
| 2211580 | 7/1989 | United Kingdom | 267/140.12 |

*Primary Examiner*—Christopher P. Schwartz
*Assistant Examiner*—Pamela J. Lipka
*Attorney, Agent, or Firm*—Kenyon & Kenyon

[57] ABSTRACT

A hydraulic sleeve having at least two liquid-filled working chambers. These chambers are in flow communication with one another through a damping channel. The hydraulic sleeve comprises an inner supporting body surrounded by an outer supporting body. A radial clearance is maintained between the inner and outer supporting bodies. An elastic spring element of elastomeric material is arranged in the gap formed by the radial clearance, and at least one separately produced insertion part is arranged in at least one of the working chambers. The elastic spring element has an essentially triangular cross-section and bounds the first working chamber. The insertion part is arranged within the triangularly bounded, first working chamber, has an essentially $\Omega$-shaped cross-section, and divides the first working chamber into three sectional chambers. The sectional chambers are in flow communication with one another through two throttle orifices that are bounded by the elastic spring element and the insertion part.

22 Claims, 4 Drawing Sheets

HYDRAULIC SLEEVE

BACKGROUND OF THE INVENTION

The present invention is directed to a hydraulic sleeve having at least two liquid-filled working chambers. Each of these chambers is in flow communication with one another through a damping channel. The hydraulic sleeve comprises an inner supporting body that is surrounded by an outer supporting body. A radial clearance is maintained between the inner supporting body and the outer supporting body. The hydraulic sleeve also includes an elastic spring element that is arranged in the gap formed by the radial clearance, and at least one separately produced insertion part that is arranged in at least one of the working chambers. The spring element is formed from an elastomeric material.

Such a hydraulic sleeve is known from German Patent No. 34 31 460 C2, which describes a stiff stop-means element that is provided in at least one of the working chambers of the known hydraulic sleeve. The stiff stop-means element prevents an excessive radial displacement of the inner and outer supporting bodies relative to one another. Further, the stop-means element is flexibly arranged within the working chambers.

An object of the present invention is to provide a hydraulic sleeve that exhibits a higher damping capacity and a lower dynamic spring rate than previously proposed hydraulic sleeves.

SUMMARY OF THE INVENTION

The hydraulic sleeve of the present invention is provided with an elastic spring element that has an essentially triangular cross-section and that bounds a first working chamber. An insertion part is arranged within the triangularly bounded first working chamber; this insertion part has an essentially Ω-shaped cross-section and divides the first working chamber into three sectional chambers. The sectional chambers are in fluidic communication with one another through two throttle orifices bounded by the elastic spring element and the insertion part. As a consequence of the design and relative positioning within the hydraulic sleeve of the insertion part and the elastic spring element, both excellent damping and a lowering of the dynamic spring rates is achieved.

In the event that the inner and outer supporting bodies are radially displaced relative to one another, liquid components are shifted from the first working chamber through a damping channel and into a second working chamber. In addition, a liquid shift takes place within the three sectional chambers through the two throttle orifices. The dynamic spring rate is lowered, in that proportionate masses of liquid fall into resonance with areas of the elastic spring element and vibrate out-of-phase with respect to an excitation. This described effect develops in the X, Y, and Z directions. The X direction extends parallel to the axis of the hydraulic sleeve, while the Y and Z directions are disposed perpendicularly to one another and describe a plane. The frequency positions of the dynamic spring rate lowering depend strongly, among other things, on the cross-sections of the throttle orifices, which, in turn, depend essentially on the form of the insertion part. Thus, it is possible to adjust the lowering of the dynamic spring rates in the different spatial directions independently of one another to the greatest extent possible by the shape of the insertion part, without disadvantageously influencing other properties of the hydraulic sleeve. The present invention can also accommodate the addition of bore holes or openings in the insertion part in the X, Y, or Z directions to further tailor the vibration damping characteristics of its sleeve. A further advantage of the present design is that the insertion part is compatible with nearly all known hydraulic sleeve designs.

One or both of the insertion part and the elastic spring element can have a surface profiling on the sides facing one another. Such profiling helps avoid the impact noises and/or cavitation that can result in the event of extreme displacements of the two supporting bodies relative to one another and the resulting contact of the insertion part and the inner supporting body that is completely surrounded by the elastic spring element.

The insertion part can be arranged in an elastically flexible manner within the first working chamber. In response to higher-frequency, small-amplitude vibrations that are introduced into the first working chamber, the insertion part functions as an absorber. This absorbing function is due to the loose arrangement of the insertion part within the first working chamber. Thus, the hydraulic sleeve according to the present invention dampens low-frequency, large-amplitude vibrations, and insulates against higher-frequency, small-amplitude vibrations.

The insertion part is designed as a multi-functional part, and one of the functions of the insertion part is to form a path-limiting stop means to avoid a mechanical overloading of the elastic spring element. Because of this, the hydraulic sleeve exhibits uniformly good working properties during a long service life.

The insertion part is preferably made of a polymer material. Therefore, the insertion part can be manufactured simply and cost-effectively from a standpoint of economics and production engineering.

The insertion part and the outer supporting body bound a liquid passage from the first working chamber into the damping channel. The shape of the insertion part allows the cross-section of the liquid passage to be particularly easy to adapt to the respective conditions present in a particular operating environment of the hydraulic sleeve. Furthermore, the utilization of a second insertion part in the second working chamber further increases the dampening in the Z direction, and this dampening is accompanied by uniform, dynamic spring rates.

BRIEF DESCRIPTION OF THE DRAWINGS

For a more complete understanding of this invention, reference should be made to the embodiments illustrated in the accompanying drawings and described below.

In the drawings.

DETAILED DESCRIPTION

Figure 1:
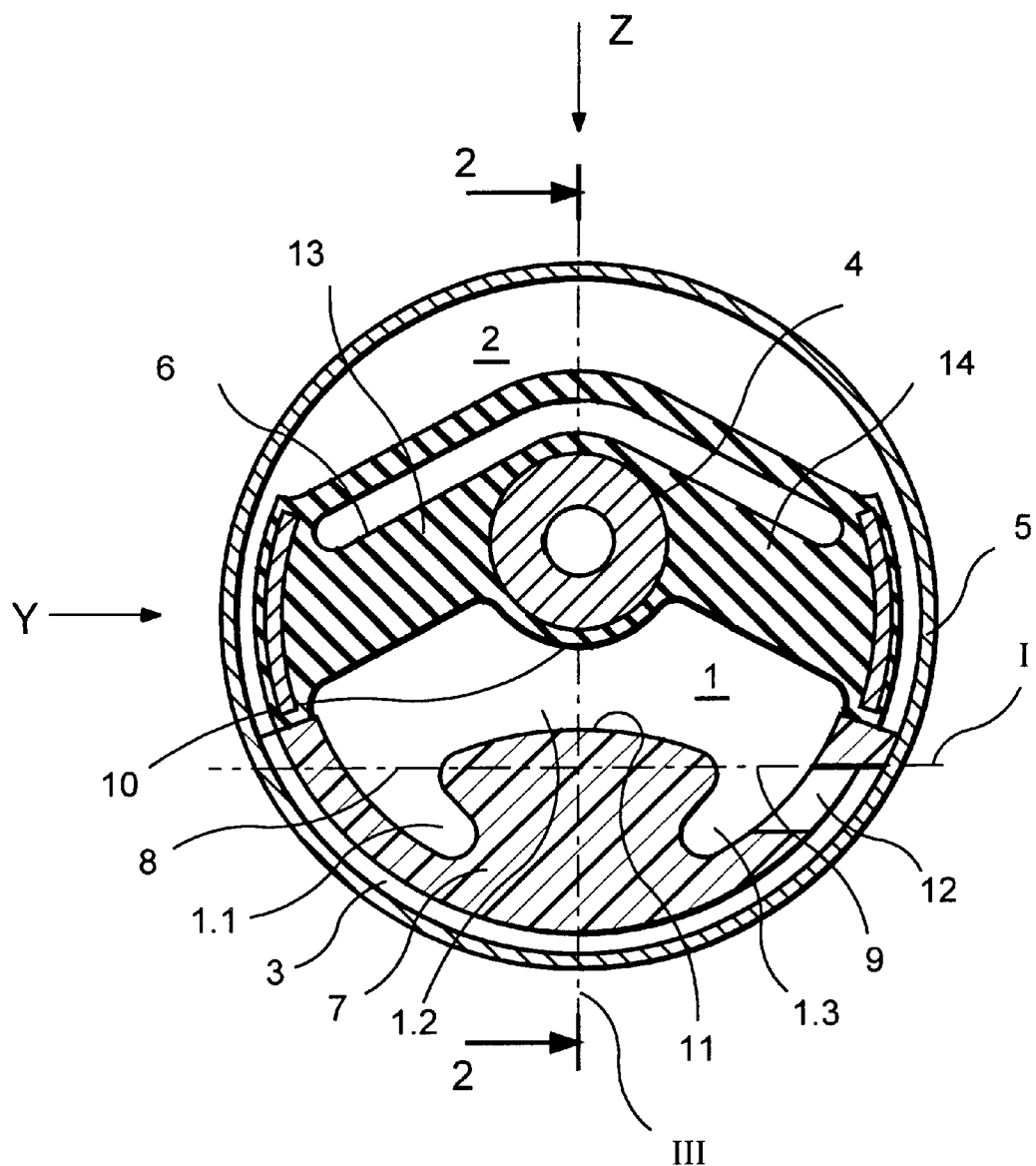
FIG. 1 is a cross-sectional view of a first embodiment of the invention taken along the line A—A from FIG. 2.
Figure 2:
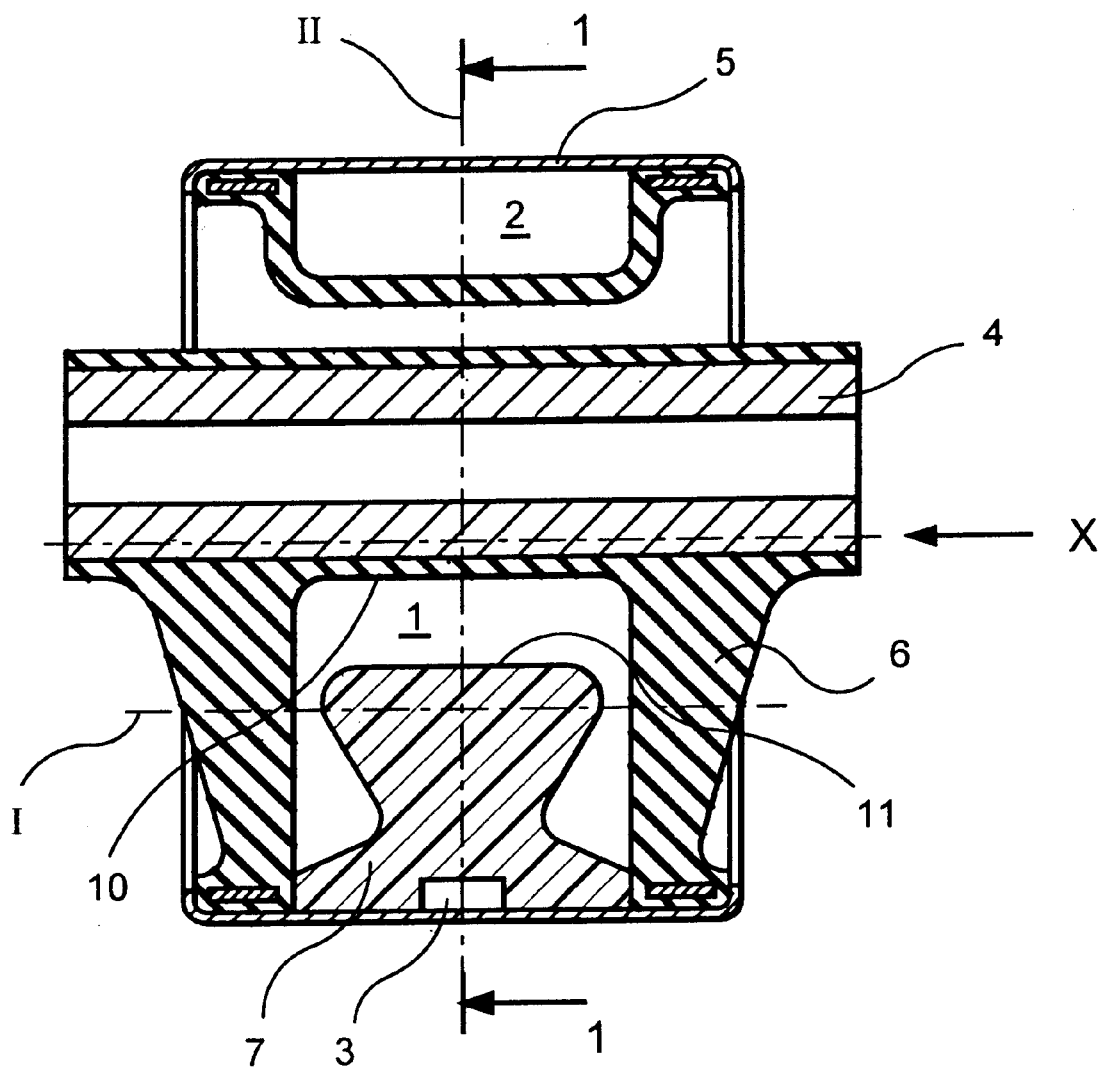
FIG. 2 is a longitudinal cross-sectional view through the hydraulic sleeve shown in FIG. 1, taken along the line B—B from FIG. 1.

FIG. 1 illustrates a cross-sectional view of a first embodiment of the hydraulic sleeve of the present invention; FIG. 2 shows a longitudinal cross-section along the line B—B from FIG. 1. Inner and outer metal supporting bodies 4 and 5 are braced against each other by elastic spring element 6, which is made of an elastomeric material. The hydraulic sleeve is shown in FIGS. 1 and 2 under a static load. In FIGS. 1 and 2, elastic spring element 6 is arranged under elastic prestressing within outer supporting body 5. Inner supporting body 4, which is arranged eccentrically relative to the outer supporting body 5, is completely surrounded by elastomeric material of the elastic spring element. Outer supporting body 5 comprises a window pipe. The outer supporting body 5 and the window pipe are fixedly joined to one another and jointly border a damping channel 3.

The two working chambers 1 and 2 are filled with an incompressible damping fluid and are in fluidic communication with one another through the damping channel 3. In this exemplary embodiment, spring segments 13 and 14 are arranged essentially at right angles to one another and bound a basically triangular, first working chamber 1. Arranged within first working chamber 1 is insertion part 7, which is formed from a polymer material and which has an essentially Ω-shaped cross-section. Due to the relative disposition of the two spring segments 13 and 14, the inner supporting body 4, and the inner portion of the insertion part 7 to one another, three sectional chambers 1.1, 1.2 and 1.3 are formed within first working chamber 1. First and second sectional chambers 1.1 and 1.2 are in fluidic communication through first throttle orifice 8, and second and third sectional chambers 1.2 and 1.3 are in fluidic communication through second throttle orifice 9. Third sectional chamber 1.3 is connected to damping channel 3 through liquid passage 12. Liquid passage 12 is bounded by outer supporting body 5 and insertion part 7.

A hydraulic sleeve of a particular design can be adapted to perform in a variety of operating conditions by using different insertion parts. Each insertion part would be appropriate for a different operating condition. The compatibility of several insertion parts with a single hydraulic sleeve simplifies and reduces the cost of manufacturing the present hydraulic sleeve.

In the exemplary embodiment of FIG. 1, insertion part 7 is provided with a surface profiling on side 11, which faces the surface 10 spring element 6, in order to avoid impact noises that may occur due to extreme excursions of inner and outer supporting bodies 4 and 5 with respect to one another.

The operation of the hydraulic sleeve causes the dynamic spring rate to be lowered, for proportionate masses of liquid fall into resonance with areas of elastic spring element 6 and vibrate out-of-phase with respect to the excitation. This effect develops along mutually orthogonal X, Y and Z directions (indicated in the drawings by arrows). The cross-sections of throttle orifices 8 and 9, which are responsible for the frequency position of the dynamic spring rate lowering, are determined by the contour of the insertion part. The effective cross-sections in each case are located between insertion part 7 and elastic spring element 6, and they are essentially directed to high-frequency vibrations introduced in the Z-direction in plane I, in the X direction in plane II, and in the Y direction in plane III.

The hydraulic sleeve of the present invention exhibits excellent damping capacity. Upon introduction of radial vibrations in the Z direction, liquid components shift out of second sectional chamber 1.2 through adjacent throttle orifices 8 and 9 into first and third sectional chambers 1.1 and 1.3 respectively. This flow of liquid results in a bulging of the two spring segments 13,14, and a certain amount of the liquid shifts out of third sectional chamber 1.3 through liquid passage 12 into damping channel 3, and thus into second working chamber 2.

Figure 3:
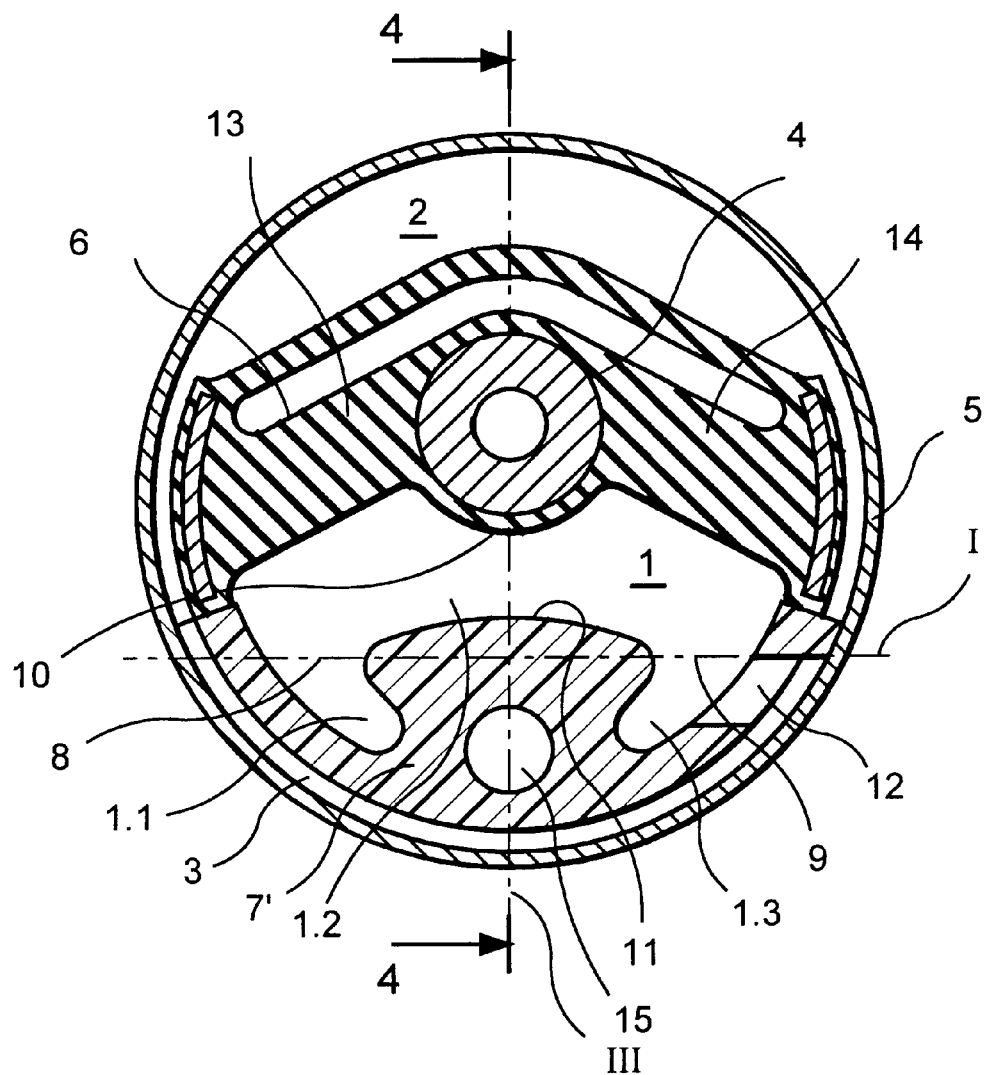
FIG. 3 is a cross-sectional view through a second embodiment along the line C—C from FIG. 4.
Figure 4:
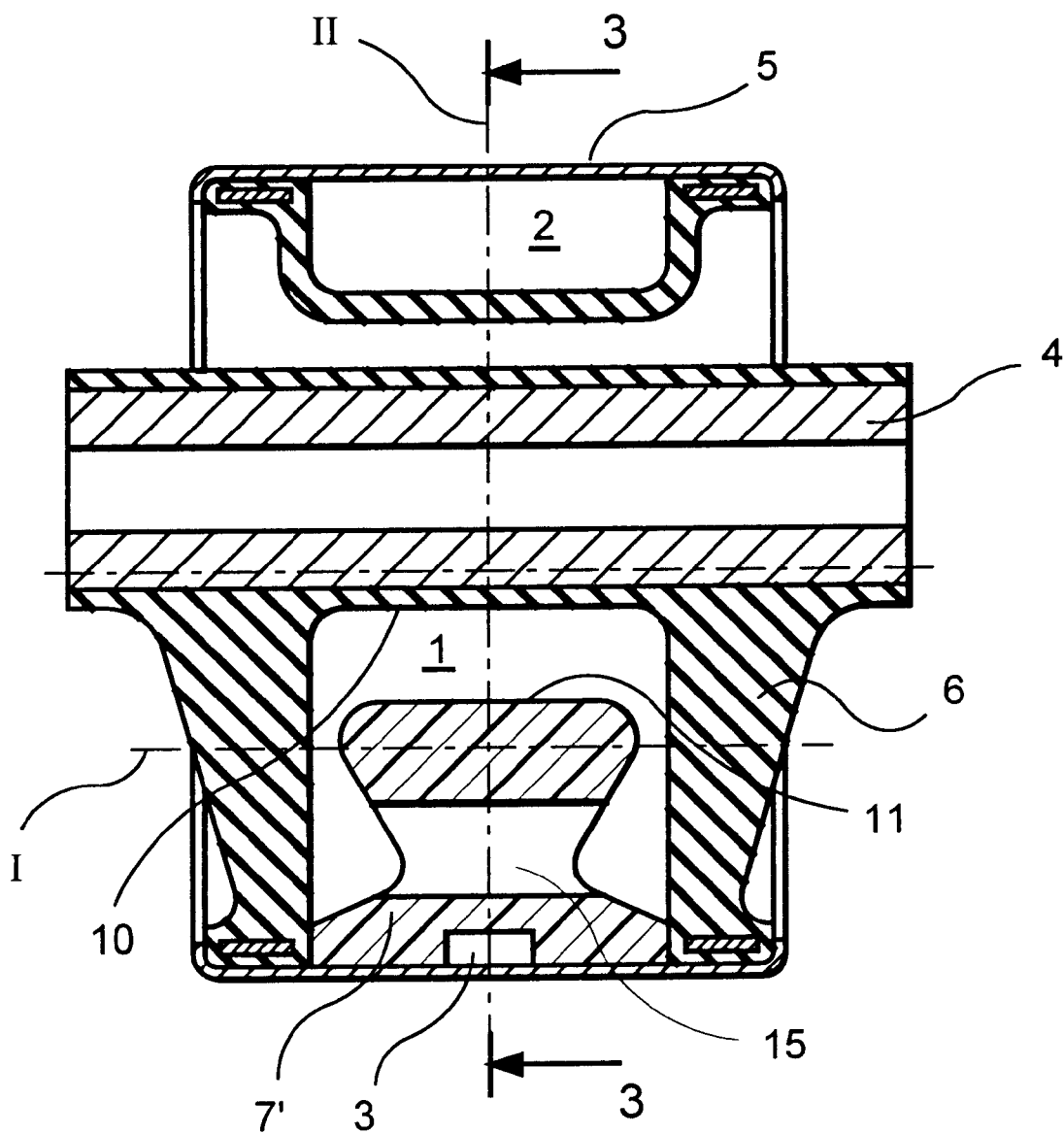
FIG. 4 is a longitudinal cross-sectional view through the hydraulic sleeve according to FIG. 3 along the line D—D.

FIGS. 3 and 4 show a second embodiment, which differs from the first embodiment of FIGS. 1 and 2 by the design of insertion part 7. Here, insertion part 7' is provided with a bore hole 15 that extends parallel to the axis of inner supporting body 4. The approach illustrated by this embodiment (i.e., the provision of an additional void space within the body of one of the components) illustrates one manner in which the working properties of the hydraulic sleeve can be tailored to a specific need.

What is claimed is:

1. A hydraulic sleeve, comprising:
   an inner supporting body;
   an outer supporting body surrounding the inner supporting body, wherein a radial clearance is maintained between the inner supporting body and the outer supporting body;
   a first liquid-filled working chamber;
   a second liquid-filled working chamber;
   a damping channel, wherein the first and second liquid-filled working chambers are in fluidic communication with one another through the damping channel;
   an elastic spring element arranged in a gap formed by the radial clearance, wherein the elastic spring element is formed from an elastomeric material, and wherein the elastic spring element has an essentially triangular cross-section and bounds the first working chamber; and
   at least one separate insertion part having an essentially Ω-shaped cross-section, wherein the insertion part is arranged within the first working chamber, wherein the insertion part divides the first working chamber into a plurality of sectional chambers that are in fluidic communication with one another through a plurality of throttle orifices bounded by the elastic spring element and by the insertion part, wherein the damping characteristics of the hydraulic sleeve are determined by selection of the geometry of the insertion part, and wherein the insertion part and the elastic spring element have facing sides, at least one of which sides includes surface profiling.

2. A hydraulic sleeve as set forth in claim 1, wherein the insertion part is arranged in an elastically flexible manner within the first working chamber.

3. A hydraulic sleeve as set forth in claim 1, wherein the insertion part is arranged in an elastically flexible manner within the first working chamber.

4. A hydraulic sleeve as set forth in claim 1, wherein the insertion part comprises a path-limiting stop means.

5. A hydraulic sleeve as set forth in claim 1, wherein the insertion part comprises a polymer material.

6. A hydraulic sleeve as set forth in claim 1, wherein the insertion part and the outer supporting body border a liquid passage that extends from the first working chamber into the damping channel.

7. A hydraulic sleeve as set forth in claim 1, wherein:
   the insertion part includes at least one lateral extension, and
   the at least one lateral extension includes a liquid passage extending from the first working chamber to the damping channel.

8. A hydraulic sleeve as set forth in claim 1, wherein:
   a cross-section of each of the plurality of throttle orifices is defined at least by a contour of a surface of the insertion part, and
   the damping characteristics of the hydraulic sleeve depend on the cross-section of at least one of the plurality of throttle orifices.

9. A hydraulic sleeve as set forth in claim 1, wherein:
the surface profiling prevents an impact noise due to an excursion of the inner supporting body and the outer supporting body with respect to each other.

10. A hydraulic sleeve, comprising:

an outer supporting body;

an inner supporting body arranged within the outer supporting body and being displaced from the outer supporting body by a predetermined radial distance;

a flexible element arranged within a gap defined by the radial distance between the inner supporting body and the outer supporting body, wherein the outer supporting body, the inner supporting body, and the flexible element define a plurality of chambers in fluid-flow communication with each other; and at least one insertion part arranged within a selected one of the plurality of chambers, the insertion part dividing the selected one of the plurality of chambers into a plurality of sectional chambers in fluid-flow communication with each other through a plurality of throttle orifices bounded by the flexible element and the insertion part, wherein at least one of the insertion part and the flexible element includes a surface profiling on a side facing one another.

11. A hydraulic sleeve as set forth in claim 10, wherein the flexible element comprises an elastic spring element.

12. A hydraulic sleeve as set forth in claim 10, wherein the insertion part has an essentially Ω-shaped cross-section.

13. A hydraulic sleeve as set forth in claim 10, wherein the insertion part comprises a polymer material.

14. A hydraulic sleeve as set forth in claim 10, wherein the selected one of the plurality of chambers comprises a substantially triangular chamber.

15. A hydraulic sleeve as set forth in claim 14, wherein the flexible element comprises a plurality of spring segments.

16. A hydraulic sleeve as set forth in claim 15, wherein the plurality of spring segments comprise at least a first spring segment and a second spring segment arranged at substantially right angles with respect to each other.

17. A hydraulic sleeve as set forth in claim 16, wherein the first spring segment and the second spring segment bound the triangular selected one of the plurality of chambers.

18. A hydraulic sleeve as set forth in claim 10, wherein the insertion part includes a bore extending in parallel to an axis of the inner supporting body.

19. A hydraulic sleeve, comprising:

an inner supporting body;

an outer supporting body surrounding the inner supporting body, wherein a radial clearance is maintained between the inner supporting body and the outer supporting body;

a first liquid-filled working chamber;

a second liquid-filled working chamber;

a damping channel, wherein the first and second liquid filled working chambers are in fluidic communication with one another through the damping channel;

an elastic spring element arranged in a gap formed by the radial clearance, wherein the elastic spring element is formed from an elastomeric material, and wherein the elastic spring element has an essentially triangular cross-section and bounds the first working chamber; and at least one separate insertion part having an essentially Ω-shaped cross-section, wherein the insertion part is arranged within at least one of the first working chamber and the second working chamber, wherein the insertion part divides the at least one of the first working chamber and the second working chamber into a plurality of sectional chambers that are in fluidic communication with one another through a plurality of throttle orifices bounded by the elastic spring element and by the insertion part, and wherein the insertion part and the elastic spring element have facing sides, at least one of which sides includes surface profiling.

20. A hydraulic sleeve as set forth in claim 19, wherein the insertion part is arranged within the first working chamber.

21. A hydraulic sleeve, comprising:

an inner supporting body;

an outer supporting body surrounding the inner supporting body, wherein a radial clearance is maintained between the inner supporting body and the outer supporting body;

a first liquid-filled working chamber;

a second liquid-filled working chamber;

a damping channel, wherein the first and second liquid filled working chambers are in fluidic communication with one another through the damping channel;

an elastic spring element arranged in a gap formed by the radial clearance, wherein the elastic spring element is formed from an elastomeric material, and wherein the elastic spring element has an essentially triangular cross-section and bounds the first working chamber; and at least one separate insertion part having an essentially Ω-shaped cross-section, wherein the insertion part is arranged within the second working chamber, wherein the insertion part divides the second working chamber into a plurality of sectional chambers that are in fluidic communication with one another through a plurality of throttle orifices bounded by the elastic spring element and by the insertion part, and wherein the insertion part and the elastic spring element have facing sides, at least one of which sides includes surface profiling.

22. A hydraulic sleeve, comprising:

an inner supporting body;

an outer supporting body surrounding the inner supporting body, wherein a radial clearance is maintained between the inner supporting body and the outer supporting body;

a first liquid-filled working chamber;

a second liquid-filled working chamber;

a damping channel, wherein the first and second liquid filled working chambers are in fluidic communication with one another through the damping channel;

an elastic spring element arranged in a gap formed by the radial clearance, wherein the elastic spring element is formed from an elastomeric material, and wherein the elastic spring element has an essentially triangular cross-section and bounds the first working chamber; and at least one separate insertion part having an essentially Ω-shaped cross-section, wherein the insertion part is arranged within the first working chamber and the second working chamber, wherein the insertion part divides the working chambers into a plurality of sectional chambers that are in fluidic communication with one another through a plurality of throttle orifices bounded by the elastic spring element and by the insertion part, and wherein the insertion part and the elastic spring element have facing sides, at least one of which sides includes surface profiling.

* * * * *

UNITED STATES PATENT AND TRADEMARK OFFICE
CERTIFICATE OF CORRECTION

PATENT No. : 6,068,247

DATED : May 30, 2000

INVENTOR(S): Axel RUDOLPH

It is certified that error appears in the above-identified patent and that said Letters Patent is hereby corrected as shown below:

Column 2, line 52, after "line" delete "A-A" and insert -- 1-1 -- therefor;

Column 2, line 54, after "line" delete "B-B" and insert -- 2-2 -- therefor;

Column 2, line 57, after "line" delete "C-C" and insert -- 3-3 -- therefor;

Column 2, line 59, after "line" delete "D-D" and insert -- 4-4 -- therefor; and

Column 2, line 65, after "line" delete "B-B" and insert -- 2-2 -- therefor .

Signed and Sealed this

Twenty-second Day of May, 2001

*Attest:*

NICHOLAS P. GODICI

*Attesting Officer*   Acting Director of the United States Patent and Trademark Office